Feb. 19, 1963 F. G. WILLEY 3,078,341

MEANS FOR INFRARED IMAGING IN COLOR

Filed Nov. 9, 1954 2 Sheets-Sheet 1

INVENTOR
FRANK G. WILLEY
BY Mitchell & Bechert
ATTORNEYS

Feb. 19, 1963 F. G. WILLEY 3,078,341

MEANS FOR INFRARED IMAGING IN COLOR

Filed Nov. 9, 1954 2 Sheets-Sheet 2

INVENTOR
FRANK G. WILLEY
BY Mitchell & Bechert
ATTORNEYS 3,078,341

MEANS FOR INFRARED IMAGING IN COLOR

Frank G. Willey, East Hills, Roslyn Heights, N.Y., assignor to Servo Corporation of America, New Hyde Park, N.Y., a corporation of New York Filed Nov. 9, 1954, Ser. No. 467,709
20 Claims. (Cl. 178—6.8)

My invention relates to optical scanning and display devices of the general character disclosed in copending application Serial No. 320,272, filed November 13, 1952, in the name of Henry Blackstone et al, now Patent No. 2,967,211.

In scanning devices of the character indicated, the latitude or dynamic range of video-signal amplitudes developed in the course of scanning substantially exceeds the reproduction capabilities of conventional display equipment. For this reason, such displays may be viewed as unnecessarily limiting the available intelligence, and this is particularly true for the case in which cathode-ray tubes are employed for display purposes. Other limitations on the display are attributable to uniformity of bandwidth response inherent in the video signal for all scans.

It is, accordingly, an object of the invention to provide improved display means in conjunction with a scanner of the character indicated.

It is another object to provide improved display means wherein a substantially greater dynamic range will inherently characterize the display.

Another object is to provide a scanner yielding a video signal inherently possessing greater intelligence than heretofore.

It is a further object to provide improved display means utilizing a greater proportion of available intelligence in the scanning video signal.

It is also an object to provide improved display means for creating a single display with readily recognizable presentations uniquely characteristic of certain specialized responses, said responses being limited with respect to the total response of the energy-responsive means associated with the scanner.

It is a general object to meet the above objects with apparatus involving relatively little additional complexity and yet affording less chance that the operator will improperly adjust the equipment when seeking a display of maximum interpretability.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Briefly stated, my invention contemplates a scanner including an energy-responsive element or elements and an optical system with means for periodically causing the image of said element or elements to traverse a scan line or frame in the field of view. Means associated with the scanner causes the video output of the energy-responsive element or elements to represent different limited bandwidth responses within the total bandwidth capabilities of the scanner. Multiple-color display means is so connected to the video output or outputs of the energy-responsive means as to display one color for the modulations representing a first limited-response bandwidth and another color for a different bandwidth response. Various arrangements are disclosed for implementing this concept.

Figures 1, 2, 3, 4:
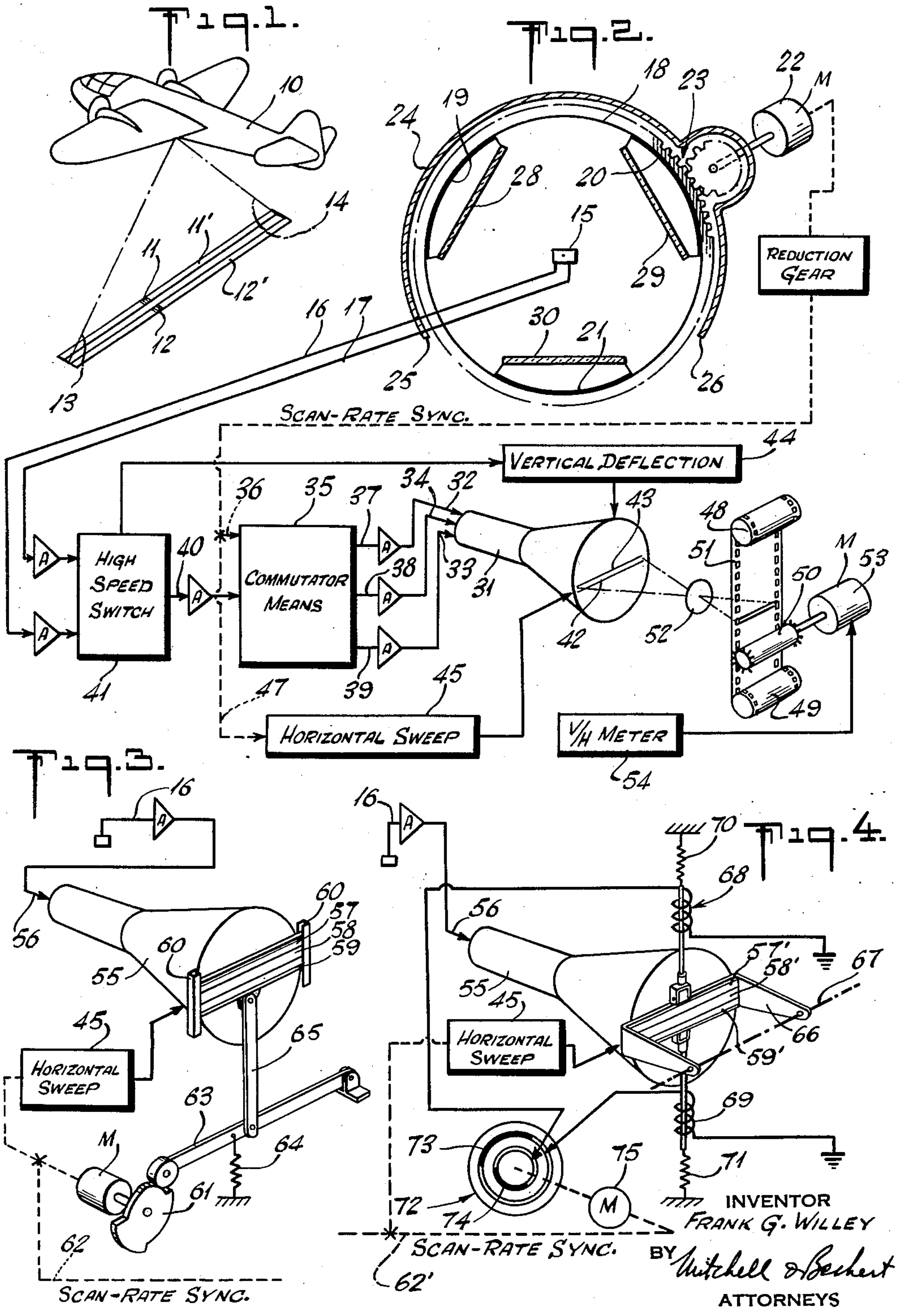
FIG. 1 is a simplified view in perspective illustrating an aircraft and the general optical capabilities of scanning equipment of the invention.
FIG. 2 is a diagram illustrating optical, mechanical, and electrical components of a scanner and display means of the type contemplated in FIG. 1.
FIGS. 3 and 4 are enlarged fragmentary diagrams of alternative components for use in the arrangement of FIG. 2.

Referring to FIGS. 1 and 2 of the drawings, my invention is shown in application to a scanner as may be carried by a reconnaissance or other aircraft 10 and having moving optical elements for periodically causing the image or images 11—12 of energy-responsive means to traverse one or more scan lines 11′—12′ beneath the aircraft, as between the lateral limits 13—14. Traversal of more than one line per scan will be understood as suggestive of frame-sequential scanning action, even though the language herein may refer to several spaced elements scanning a line.

The scanner may be one of various types, but, for simplicity of description in the present connection, I have chosen to illustrate the invention as applied to a scanner of the type disclosed in the above-identified copending Blackstone et al. application. Such a scanner may include energy-responsive means, such as cell 15, having one or more energy-responsive elements; and since, in the form shown, two elements are used to develop the ground images 11—12, two separate video outputs 16—17 are available from the cell 15.

The cell 15 may be at the center of rotation of a scanner drum 18 on which are mounted a plurality of like optical elements 19—20—21, which may be lenses but which are shown as mirrors of effectively equal angular width and spaced from each other by amounts equal to their widths. The scanner may be continuously driven, as by a motor 22 having a drive connection 23 to the drum 18. To avoid spurious responses, shielding means 24 are shown to embrace the entire scanner structure except for a window or opening between limits 25—26, through which the incoming energy may pass to only one of the mirrors 19—20—21 at a time, for focusing on the cell 15.

In accordance with the invention, I provide means whereby the video signals available in either or both of the lines 16—17 may represent particular responses, characterized by a plurality of bandwidth limitations during any scan cycle. In the form shown, this is accomplished by placing different filters 28—29—30 between the respective optical elements 19—20—21 and the energy-responsive cell 15. For convenience, the filters may be secured closely adjacent their respective optical elements and may, therefore, be carried for rotation with the scanner drum 18; alternatively, the filters may be carried by the drum 18 relatively close to the cell 15, in order to reduce the required filter size. Each of the filters 28—29—30 is preferably chosen with a different characteristic pass band within the total response bandwidth of the cell 15. Thus, for example, if the cell 15 has an energy response, say from 1 to 15 microns, the filter means 28 may have a response from 1 to 5 microns, while the filter 29 may have a response of 5 to 10 microns and the filter 30 may have a response of 10 to 15 microns. Other divisions of limited response may be provided to meet particular requirements, as will be understood.

With the described structure, any full cycle of the scanner drum 18 will develop three scan lines of video signal in each of the output connections 16—17. The first of these scan lines will have both elements of the cell 15 represent scanning through filter 28, and successive scan lines will represent scanning through filters 29—30, as will also be understood.

For display purposes, three separate displays may be created for each of the characteristic scans developed by the respective mirror-filter combinations 19—28, 20—29, and 21—30. However, in the form shown, I create a single display in which the response due to the characteristically different scans in a cycle of the drum 18 is immediately recognizable by different color modulations. To this end, I may use a three-color cathode-ray display 31 having separate intensity-modulation color-control inputs 32—33—34. Commutator means 35 may be synchronized as suggested at 36 with the rate of scan action to sort into each of three separate outputs 37—38—39 the video signals characteristic of the three aforementioned characteristically limited scans. Since, in the form shown, the cell 15 includes two elements, I combine the outputs of these elements into a single video-signal line 40, as by employment of a high-speed switch 41 alternately sampling the respective video connections 16—17. In order that the display lines 42—43 may properly represent ground-scan lines 11′—12′, I provide vertical-deflection means 44 for the tube 31 and synchronized with switch 41, all as described in greater detail in the said Blackstone et al. application. The horizontal sweep 45 may be synchronized with the scan rate, as suggested by the connection 47.

In operation, the two horizontally extending lines 42—43 may be created on the display once for every sweep of the images 11—12 across the field of view 13—14. Successive sweeps will involve different responses, and these will be appropriately color-modulated in the display. As explained in said copending application, an integrated interpretation of a succession of scans may be developed by superposing on the vertical-deflection means 44 a relatively long-period sweep signal to displace or depress the horizontal axis of the display in accordance with the velocity-altitude function (or $V/H$ rate) of the aircraft. However, in the form shown, I employ recording means, such as a camera, with means, such as supply and take-up reels 48—49 and sprocket means 50, for supporting and advancing color film or the like 51 through the focal plane of imaging optics 52. For proper integration in the case of an aircraft 10 (and for scanning in accordance with the described method), it is desirable that the drive motor 53 for the sprocket 50 shall be controlled in accordance with the velocity-altitude function (or $V/H$ rate) of the aircraft, as schematically designated at 54. The device 54 may be of a type disclosed in greater detail in copending Blackstone application Serial No. 444,990, filed July 22, 1954, now Patent No. 2,878,211.

In FIGS. 3 and 4, I show alternative constructions for display means capable of utilizing the video outputs in lines 16—17. However, for simplicity, FIGS. 3 and 4 show display for only one of such outputs as, for example, the line 16, so labeled in FIGS. 3 and 4, it being understood that the high-speed switch 41 and vertical-deflection means 44 could be employed in the arrangements of FIGS. 3 and 4 if two scan lines are to be interpreted for each optical scan of the field of view.

In both FIGS. 3 and 4, I employ cathode-ray display devices 55 having single input intensity-modulation means 56 responsive to the scanned video signal. In both cases, the desired color is developed in the display by sequentially introducing appropriate color filters in viewing alignment with the display, all in synchronism with scan action, on a line-sequential basis.

In the form of FIG. 3, a simple rectangular frame of three separate color filters 57—58—59 is guided in vertical ways 60 and is positioned in one of three locations by means of a cam-and-follower mechanism, involving a continuously driven cam 61 having synchronized connections (suggested at 62) with the basic scan rate, and driving a follower arm 63 against a tension spring 64. A link 65 transfers follower movement to the color-filter frame.

In FIG. 4, the frame for supporting the three color filters 57′—58′—59′ may be the same as described in FIG. 3, but is shown to include a yoke 66 pivoted on an axis 67 and positioned successively in each of three positions to align the respective color filters with the instantaneous display. The positioning means is shown to include separate solenoid means 68—69 and frame-based tension springs 70—71. A commutator element 72 may have arcuate segments 73—74 determining which of solenoids 68—69 will be energized, and for the form shown, each solenoid is energized for a different one-third of the cycle of commutator 72, the remaining one-third involving no solenoid excitation and therefore allowing the springs 70—71 to position the filter frame for alignment of the center filter 58′ with the instantaneous display. To complete the structure, motor means 75 continuously drives the commutator 72 in synchronism with the scan rate, as suggested at 62′. Recorder means of the type described at 51 in FIG. 2 may be employed to record the displays developed by the structures of FIGS. 3 or 4, it being understood that in such case the filters 57′—58′—59′ are placed in alignment with optical axis 52 (FIG. 2).

Figure 5:
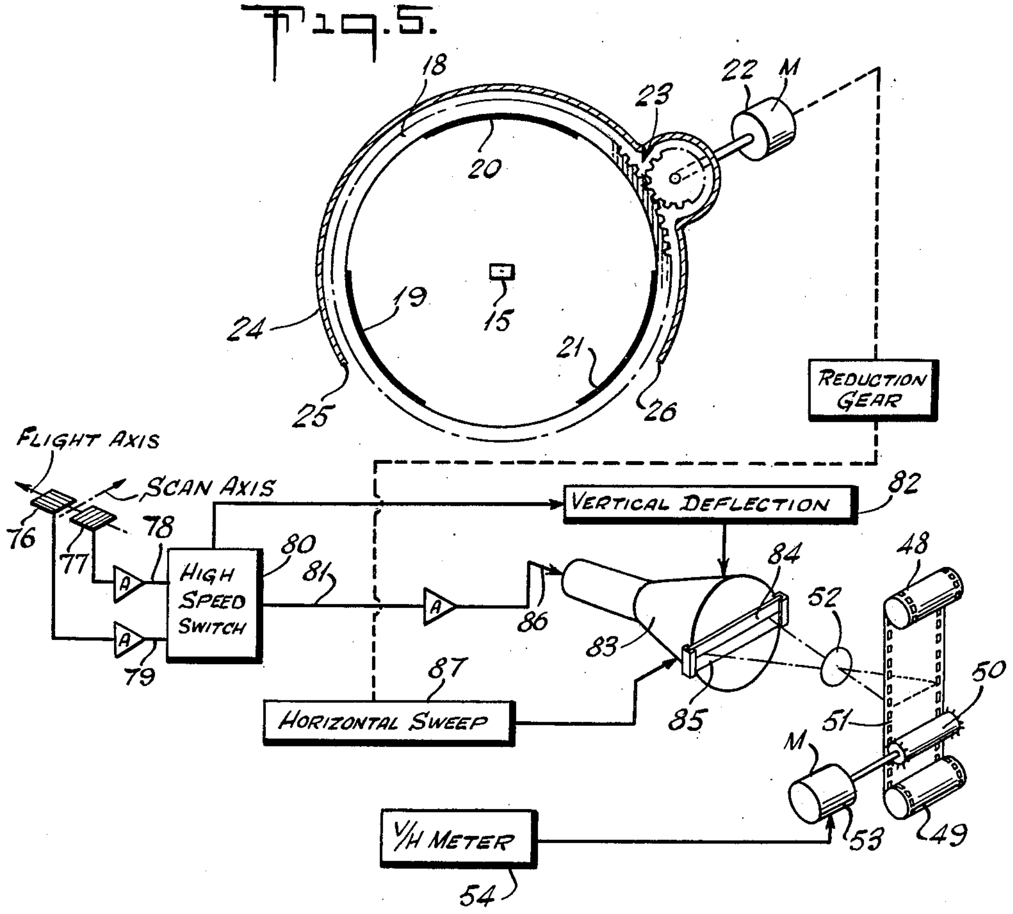
FIGS. 5 and 6 illustrate organizations representing alternatives to the arrangement of FIG. 2.

In FIG. 5 I show a modification in which no reliance is made on filters (as at 28—39—30 in FIG. 2) in order to develop different limited bandwidths of response, as for multiple-color display. The basic scanner structure of FIG. 5 may, however, otherwise generally resemble that of FIG. 2, and corresponding parts have, therefore, been given the same reference characters. In the arrangement of FIG. 5, the cell 15 includes a plurality of energy-responsive elements 76—77 which may, as in FIG. 2, be spaced from each other in the direction of the flight axis and which are, therefore, transverse to the scan axis, as schematically depicted in FIG. 5. The two elements 76—77 will thus scan separate lines, such as the lines 11′—12′ of FIG. 1.

In accordance with the invention, the responses of the two cell elements 76—77 are different; for example, one of said elements, such as element 76, may be a lead-sulfide cell, primarily responsive to a so-called near-infrared band; and the other cell 77 may be a so-called thermistor element, having a response extending to the far-infrared region. Of course, for each optical-scan action, elements 76—77 will traverse the field of view, and different video outputs will be available in lines 78—79 for the two cells. In order to combine both video outputs on a single display, I have shown the method used in FIG. 2, namely, a high-speed switch 80 commutating both video signals into a single output-video line 81. A vertical-deflection circuit 82 resembling that described at 44 may be synchronized with action of switch 80 to establish two instantaneously displayed lines on the face of the cathode-ray tube 83. The tube 83 may be of multi-color variety, in which case separate intensity-modulation connections will be made for each color to the respective video lines 78—79; however, since one line always represents one response and the other line always represents the other response, there is no particular need for the expense of a multi-color display tube, and I suggest at 84—85 that different color filters may be permanently held in register with the respective display lines on the face of tube 83. The tube 83 may thus be of the ordinary black-and-white variety having a single intensity-modulation connection 86 to the video line 81. The horizontal sweep 87 may be synchronized with a scan action and otherwise the same as described for the previous forms. Also, the recorder means 51 may be as described in FIG. 2, and, for this reason, correspondnig parts are given the same reference numerals.

Figure 6:
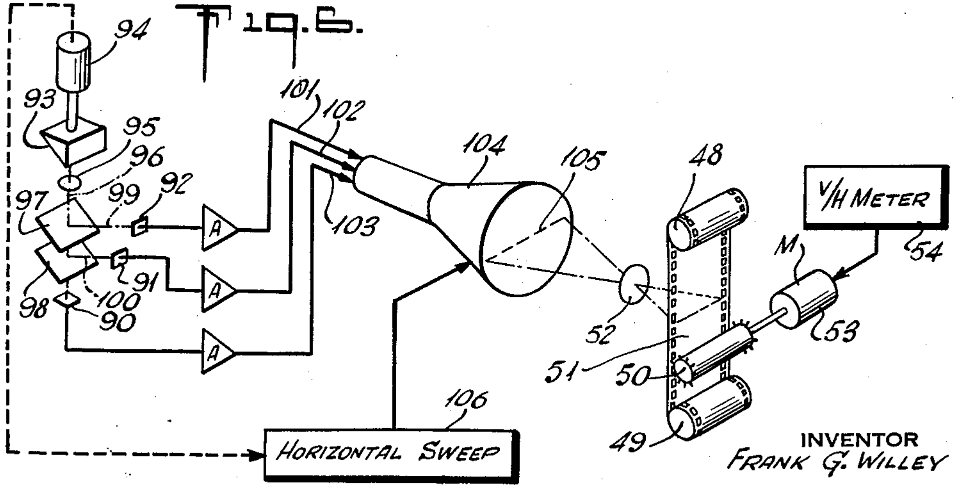

In FIG. 6, I show a further modification wherein three separate cells or cell elements 90—91—92 are continuously exposed to energy collected by a scanner periodically traversing a line across the field of view. The scanner shown happens to be an inclined mirror 93 driven by motor means 94 and including focusing optics, such as a lens 95 having a primary response axis 96. In order that the cells 90—91—92 may be continuously exposed, I provide beam-splitting and filtering means, such as semi-reflecting filters 97—98 on the axis 96 and effective to pass a first limited band on the deflection axis 99 to the cell 92, while also passing a second limited band on the deflection axis 100 to the cell 91, and a third limited band along the axis 96 to the cell 90. With suitable signal amplification, the three video signals separably available in lines 101—102—103 may be fed to the respective separator color-modulation connections to a three-color display tube 104 and the resulting single displayed line 105 (for each optical scan of the field of view) will be color-modulated to reflect the separate characteristic responses of the cells 90—91—92. No vertical deflection is needed for this single-line display, and the horizontal sweep 106 may be synchronized with scan action, as previously described. The recorder means 51 may be as previously described and, therefore, the same reference numerals are used.

It will be seen that I have described ingenious means for improving the interpretability of displays for scanners of the character indicated. Not only have I improved the interpretability, but I have provided means for displaying a greater quantity of intelligence gathered in the same unit time as with previous devices. Both these features are provided without material increase in complexity of equipment, and an efficient and more useful device has been made available.

While I have described the invention in detail for the preferred forms shown, it will be understood that modifications may be made within the scope of the invention as defined in the claims which follow.

I claim:

1. Optical scanning and display means, comprising energy-responsive means having an electrical response to incident energy, a scanner including an optical element, and means for moving said optical element to cause the image of said energy-responsive means to scan a line in a field of view, said scanner further including means for causing the video output of said energy-responsive means to represent response to differently limited bandwidths within the total bandwidth of response of said energy-responsive means, and multi-color display means connected for response to the output of said energy-responsive means and separately displaying different colors for the different bandwidth responses of said energy-responsive means.

2. Optical scanning and display means, comprising energy-responsive means having an electrical response to incident energy, a scanner including an optical element imaging said energy-responsive means in a field of view, means for moving said optical element to cause the image of said energy-responsive means to scan a line across the field of view, said scanner further including a filter of pass band limited with respect to the response bandwidth of said energy-responsive means, means synchronized with scanner action for periodically interposing said filter in and removing said filter from the path of energy incident upon said energy-responsive means, two separate video-display means, means including a commutator connecting said separate video display means to the video output of said energy-responsive means and synchronized with the periodicity of interposing and removing said filter as aforesaid, whereby one of said video display means may create a display representing response affected by said filter and the other of said video display means may create a display representing response without said filter.

3. Optical scanning and display means, comprising energy-responsive means having an electrical response to incident energy, a scanner including an optical element imaging said energy-responsive means in a field of view, means for moving said optical element to cause the image of said energy-responsive means to scan a line in the field of view, said scanner further including two filters having separate pass bands both overlapping part of the total response band of said energy-responsive means, means synchronized with scanning action for periodically and successively introducing said filters in the path of energy incident upon said energy-responsive means, whereby the video output of said energy-responsive means may successively represent output influenced first by one and then by the other of said filters, commutating means synchronized with scanning action for segregating into two output channels the respective filter-characterized responses of said energy-responsive means, and separate video-display means separately connected to the respective outputs of said commutator.

4. Optical scanning and display means, comprising energy-responsive means having an electrical response to incident energy, a scanner including an optical element imaging said energy-responsive means in a field of view, means for moving said optical element to cause the image of said energy-responsive means to scan a line in the field of view, said scanner further including two filters having separate pass bands both occurring within the response band of said energy-responsive means, means synchronized with scanning action for periodically and successively introducing said filters in the path of energy incident upon said energy-responsive means, whereby the video output of said energy-responsive means may successively represent output influenced first by one and then by the other of said filters, commutating means synchronized with scanning action for segregating into two output channels the respective filter-characterized responses of said energy-responsive means, and a single multi-color display device connected for response to one of said commutator outputs to display a first color and for response to the other of said commutator outputs to display a second color.

5. Scanning and display means according to claim 4, in which said display device is a multi-color cathode-ray tube with first color-modulating means connected to one of said commutator outputs and with second color-modulating means connected to the other of said commutator outputs.

6. Optical scanning and display means, comprising energy-responsive means having an electrical response to incident energy, a scanner including an optical element imaging said energy-responsive means in a field of view, means for moving said optical element to cause the image of said energy-responsive means to scan a line in the field of view, said scanner further including two filters having separate pass bands both occurring within the response band of said energy-responsive means, and means synchronized with scanning action for periodically and successively introducing said filters in the path of energy incident upon said energy-responsive means, whereby the video output of said energy-responsive means may successively represent output influenced first by one and then by the other of said filters, cathode-ray display means having an intensity-modulating connection to the output of said energy-responsive means, a color filter, and means for introducing and removing said filter into and from viewing alignment with part of the face of said cathode-ray display means, said last-defined means being synchronized with scan action.

7. Scanning and display means according to claim 6, in which said display means includes a further color filter, and means synchronized with scan action for alternately placing first one and then the other of said color filters in viewing alignment with said part of said face.

8. Scanning and display means according to claim 6, in which the means for placing said color filter in and out of viewing alignment with said part of said cathode-ray display means includes a motor-driven cam-and-follower mechanism synchronized with scanning action of said scanner.

9. Scanning and display means according to claim 6, in which said means for placing said color filter in and out of viewing alignment with the face of said cathode-ray display means includes solenoid-actuated means, and means synchronized with scan action for actuating said solenoid-actuated means.

10. Optical scanning and display means, comprising energy-responsive means including two elements having separate electrical responses to incident energy of different bandwidth, a scanner including an optical element, means for moving said optical elements to cause the images of said energy-responsive elements to scan a line in a field of view, whereby the video output of one of said elements may represent a first bandwidth of response and the video output of the other element may represent a second bandwidth of response for any given line occasioned by scan action, and display means modulated in accordance with said video outputs and separately displaying a first color modulation corresponding to scan by one of said energy-responsive elements and a second color modulation corresponding to scan by the other of said energy-responsive elements.

11. In combination, relatively fixed energy-responsive means, a scanner including three like optical elements mounted in angularly spaced relation and supported for rotation about said energy-responsive means, said optical elements being supported at a radius such as to focus on said energy-responsive means, separate filters carried by said scanner and separately interposed between the respective optical elements and said energy-responsive means, whereby energy incident on said energy-responsive means and collected by one of said optical elements may be of a different bandwidth from energy incident on said energy-responsive means and collected by another of said optical elements, video display means including a modulating connection to the video output of said energy-responsive means, color-control means associated with said display means and synchronized with scan action for displaying different colors for the different video modulations attributable to scan by the responsive optical elements of said scanner.

12. The combination of claim 11, in which said display means is a three-color cathode-ray tube with separate color-modulation inputs for each color to be displayed, commutator means connecting said inputs to the output of said energy-responsive means, and means synchronizing the action of said commutator means with scan action.

13. The combination of claim 11, in which said display means includes a cathode-ray tube having a single intensity-modulation connection to said energy-responsive means, color-filter means, and means for periodically placing said filter means in viewing alignment with the display on said tube, said last-defined means including a synchronizing connection to said scanner.

14. The combination of claim 11, in which said display means includes a color-responsive recorder, and means for imaging the color-modulated display on said recorder.

15. The combination of claim 14, in which said recorder includes means for supporting a strip of color film in the focal plane of said imaging means, and means for continuously advancing said film during display of color modulations.

16. Optical scanning and display means, comprising a scanner including an optical element having a focusing axis and means including a mirror for sweeping the reflection of said axis across a field of view, band-separation means on said axis for dividing energy passing along said axis into energy of a first bandwidth on a first deflection axis and energy of a second bandwidth on a second deflection axis, separate energy-responsive elements on said respective deflection axes, multi-color display means having modulation means connected for response to the video outputs of said energy responsive elements and including means for displaying a first color for modulations occasioned by the response of one of said energy-responsive elements and a second color for modulations occasioned by response of the second of said energy-responsive elements.

17. Optical scanning and display means according to claim 16, including second band-separation means dividing energy passing along said first-mentioned axis into energy of a third bandwidth on a third deflection axis, and a further energy-responsive element on said third deflection axis, said display means including modulation means connected for response to the video output of said further energy-responsive element for displaying a third color for modulations occasioned by response of said further element.

18. An optical scanning and display device, comprising first and second energy-responsive means having independent electrical responses to incident energy, the response band of one of said means being different from that of the other, a scanner including an optical element imaging both said means in a field of view, means for moving said optical element to cause the images of said energy-responsive means to scan the field of view, two separate video-display means, means connecting the video output of one of said energy-responsive elements to one of said displays and the output of the other of said energy-responsive elements to the other of said displays, whereby separate concurrent displays may be created to represent different response bands on the same scan.

19. An optical scanning and display device, comprising first and second energy-responsive means having independent electrical responses to incident energy, the response band of one of said means being different from that of the other, a scanner including an optical element imaging both said means in a field of view, means for moving said optical element to cause the images of said energy-responsive means to scan the field of view, color-display means, means including a commutator alternately connecting the video outputs of said respective energy-responsive means to said color-display means, and means synchronized with commutator action and in color-modulating relation with said display means, there being essentially one displayed color representing the video output of one of said energy-responsive means and essentially a different displayed color representing the video output of the other of said energy-responsive means.

20. An optical scanning and display device, comprising first and second energy-responsive means having independent electrical responses to incident energy, the response band of one of said means being different from that of the other, a scanner including an optical element imaging both said means in spaced relation in a field of view, means for moving said optical element to cause the images of said respective energy-responsive means to scan spaced lines across the field of view, color-display means, means including a commutator alternately connecting the video outputs of said respective energy-responsive means to said color-display means, and means synchronized with commutator action and in color-modulating relation with said display means, there being essentially one displayed color representing the video output of one of said energy-responsive means and essentially a different displayed color representing the video output of the other of said energy-responsive means.

References Cited in the file of this patent

UNITED STATES PATENTS 2,403,066 Evans ---------------- July 2, 1946
2,428,351 Ayres ----------------- Oct. 7, 1947